United States Patent

Ueda et al.

Patent Number: 5,405,422
Date of Patent: Apr. 11, 1995

[54] SELF-HEATING FILTER

[75] Inventors: Naoki Ueda, Kariya; Hiroshi Kondo; Yasuou Yamazaki, both of Nagoya; Yukihisa Takeuchi, Chita, all of Japan

[73] Assignee: Nippondenso Co., Ltd., Kariya, Japan

[21] Appl. No.: 64,153

[22] PCT Filed: Sep. 17, 1992

[86] PCT No.: PCT/JP92/01188

§ 371 Date: May 20, 1993

§ 102(e) Date: May 20, 1993

[87] PCT Pub. No.: WO93/05862

PCT Pub. Date: Apr. 1, 1993

[30] Foreign Application Priority Data

Sep. 20, 1991 [JP] Japan .................. 3-269981

[51] Int. Cl.⁶ .............................................. B01D 35/18
[52] U.S. Cl. ........................................ 55/267; 55/282;
55/520; 55/DIG. 10; 55/DIG. 30; 60/300;
95/283; 422/174
[58] Field of Search ......... 55/520, 267, 282, DIG. 30,
55/DIG. 10; 96/146; 422/174; 95/283, 278;
60/320, 299, 300; 502/56

[56] References Cited

U.S. PATENT DOCUMENTS

| | | |
|---|---|---|
| 3,933,643 | 1/1976 | Colvin et al. .................. 55/520 X |
| 4,661,126 | 4/1987 | Inagami et al. ................ 95/283 |
| 4,872,889 | 10/1989 | Lepperhoff et al. ............ 55/267 |
| 4,928,485 | 5/1990 | Whittenberger ............... 60/299 |
| 5,042,249 | 8/1991 | Erdmannsdoerfer ......... 55/520 X |
| 5,070,694 | 12/1991 | Whittenbergera ............. 60/300 |
| 5,110,561 | 5/1992 | Hitachi et al. ................. 55/520 X |

FOREIGN PATENT DOCUMENTS

| | | |
|---|---|---|
| 0035053 | 2/1984 | European Pat. Off. . |
| 0270990 | 6/1988 | European Pat. Off. . |
| 0358522 | 3/1990 | European Pat. Off. . |
| 55-131518 | 10/1980 | Japan . |
| 57-110311 | 7/1982 | Japan . |
| 57-163112 | 10/1982 | Japan . |
| 58-137425 | 8/1983 | Japan . |
| 58-143817 | 8/1983 | Japan . |
| 58-170516 | 10/1983 | Japan . |
| 61-187912 | 8/1986 | Japan . |
| 63-197511 | 8/1988 | Japan . |
| 2-256812 | 10/1990 | Japan . |

Primary Examiner—Richard L. Chiesa
Attorney, Agent, or Firm—Cushman, Darby & Cushman

[57] ABSTRACT

In a roll of electrically conductive filter materials (21-28) coiled together with spacers (31) to be (38) disposed in alternate relation to the filter materials, the filter materials (21-28) have a plurality of pairs of adjoining edges joined together to define openings for admitting gases into the roll, so that the filter materials (21-28) may collect particulates from the gases flowing therethrough. A central electrode (41) is connected in the center of the roll, while a cylindrical outer electrode (42) is connected about the outer periphery of the roll, so that upon application of an electric voltage thereacross, the two electrodes may supply an electric current to the filter materials (21-28) to heat them for regeneration.

13 Claims, 13 Drawing Sheets

SELF-HEATING FILTER

TECHNICAL FIELD

This invention relates to a self-heating filter, i.e. a filter of the type which can heat itself, and more particularly, to a self-heating filter for removing particulates from exhaust gases of a diesel engine, or the like.

BACKGROUND ART

A known filter for collecting the particulates discharged by a diesel engine, or the like is disclosed in, for example, Japanese Patent Application Laid-Open under No. 131518/1980 or 170516/1983.

This filter is made of a ceramic material, and is provided upstream thereof with a regenerating heater for removing particulates by burning from the filter and thereby regenerating it.

There has also been proposed a filter provided with a regenerating burner, instead of the heater, for blowing a flame against the filter to regenerate it.

There has also been proposed a self-heating filter comprising a ceramic honeycomb which is formed from electrically conductive silicon carbide and can heat itself electrically for regeneration by burning particulates (Japanese Patent Application Laid-Open under No. 110311/1982).

The filter mentioned above as a first example of the known devices has, however, been found to present a number of problems. It is necessary to detect accurately the amount of particulates collected by the filter. If the amount is too small, fire goes out sooner than the filter can be regenerated, but if it is too large, the filter cracks or melts down. The filter is easily broken, since it is likely to have a temperature distribution lacking uniformity, and is also low in mechanical strength.

The filter mentioned as a second example requires the burner as special equipment. Moreover, it presents the same problems of cracking, etc. as the first example of filter does.

The self-heating filter mentioned as a third example has the advantage that it can be regenerated without the aid of any special equipment, insofar as it can heat itself.

This filter is, however, difficult to manufacture, since silicon carbide shows a high degree of shrinkage when a molded product thereof is fired. Moreover, it is easily broken during its regeneration under heat. For these and other reasons, the filter has been available only in a limited variety of shapes, or with a great deal of difficulty in the selection of an appropriate value of electrical resistance.

Under these circumstances, it is an object of this invention to provide a self-heating filter which has a high degree of strength to withstand regeneration under heat and a high efficiency in the collection of fine particles, and is easy to manufacture.

DISCLOSURE OF THE INVENTION

According to this invention, a self-heating filter comprises a roll of an electrically conductive filter material having a plurality of pairs of adjoining edges joined together to define openings facing the flow of gases to collect fine particles from the gases passing through the filter material, and electrodes provided at each of the center and outer periphery of the roll for applying an electric current to heat the filter material.

The most outstanding feature of this invention resides in the electrically conductive filter material coiled in a roll, and having a plurality of pairs of adjoining edges joined together to define openings to collect fine particles from the gases passing through the filter material. Another important feature resides in the electrodes provided in the center, and along the outer periphery, respectively, of the roll of the filter material.

The filter material is a gas-permeable porous material which can collect fine particles from gases. The material is also electrically conductive. The filter material may, for example, be a composite material formed from a metal net, and a porous sintered product of a metal or ceramic powder, as will be described in Example 1. The metal powder may, for example, be of a ferritic stainless steel containing aluminum.

The filter material is so joined as to define openings facing the flow of gases, and thereby causing them to pass through the filter material before they are exhausted.

The roll of the filter material may consist of a single sheet of material, or, for example, two or 10 sheets of material coiled together. A spacer is preferably interposed between every two adjoining layers, or sheets of the rolled filter material for keeping them spaced apart from each other, and also for reinforcing the filter material. The filter material may be a corrugated or plane sheet, but it is essential to ensure that a clearance be maintained between every two adjoining layoffs of the filter material for admitting and exhausting gases.

Likewise, the spacer may be a corrugated or plane sheet, but it is essential to ensure that gases be allowed to flow between the filter material and the spacer.

The spacer may, for example, be formed from a ferritic stainless steel sheet containing aluminum. The spacer may have an insulating oxide layer formed on its surface by, for example, oxidation by heat. The rolled filter material preferably has an inner end connected to the electrode in its center, and an outer end connected to the electrode along its outer periphery, so that an electric current may be passed through the filter material for heating it.

The spacer may, or may not be interposed between the adjoining edges of the rolled filter material which are joined together. If the joining of the edges is effected by welding, brazing, sintering, etc. and enables, therefore, electrical connection, too the electric current supplied for heating the filter material flows not only spirally along the filter material, but also radially of the filter.

The edges of the filter material can also be joined together by using an inorganic insulating adhesive.

The self-heating filter of this invention exhibits a particularly good result in the collection of particulates from exhaust gases of a diesel engine, though it can also be used very effectively to remove fine particles from other gases, such as smoke. It can also be used as a support for a catalyst for purifying exhaust gases if a filter material having a larger pore diameter is employed.

The fine particles which gases contain are collected on and in the filter material when the gases pass through it. After the filter has been used for a certain period of time, the flow of gases is interrupted, and an electric current is applied between the center and outer periphery of the roll for heating the filter material, and air is passed through the filter material for burning fine particles.

The electric current flows spirally through the filter material and thereby generates heat therein. The fine particles collected by the filter material are burned by the heat and the air, and are further raised in temperature by the heat of combustion which the particles themselves produce, whereby they are removed from the filter.

As the electric current flows spirally along the rolled filter material, the filter of this invention can be heated substantially uniformly in both its central and outer peripheral portions. Therefore, it has a uniform temperature distribution which ensures that the filter material not be broken, or otherwise damaged. Its uniform heating also enables a high efficiency of regeneration.

The self-heating filter of this invention is easy to manufacture, since it can be manufactured by rolling the filter material. Thus, this invention provides a self-heating filter which has a high degree of strength to withstand regeneration under heat and a high efficiency in the collection of fine particles, and is easy to manufacture.

BRIEF DESCRIPTION OF THE DRAWINGS

FIG. 26 is a fragmentary sectional view of another modified form of filter according to Example 3;

BEST MODE OF CARRYING OUT THE INVENTION

[EXAMPLE 1]

A self-heating filter embodying this invention will now be described with reference to FIGS. 1 to 13. The filter comprises a roll of eight sheets 21 to 28 of an electrically conductive filter material coiled together with spacers 31 to 38 disposed in alternate relation to the filter material, as shown in FIGS. 1 to 6. The filter materials 21 to 28 are corrugated, while the spacers 31 to 38 are plane sheets (FIG. 5).

Figure 4:
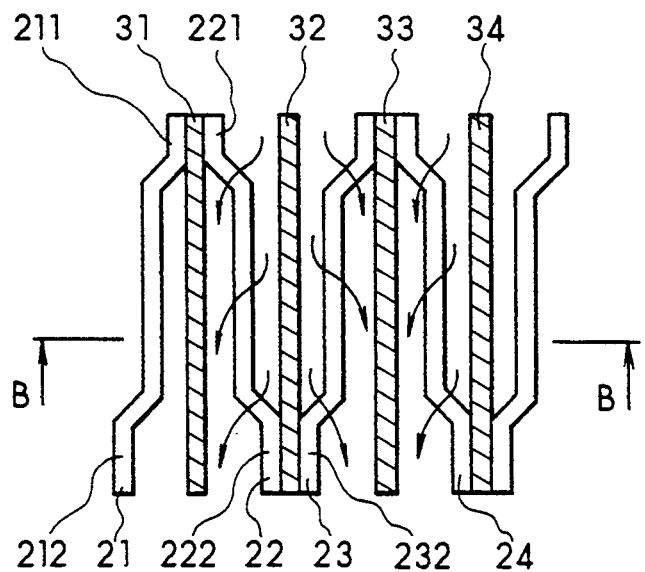
FIG. 4 is an enlarged fragmentary sectional view taken along the line A—A of FIG. 1.
Figure 5:
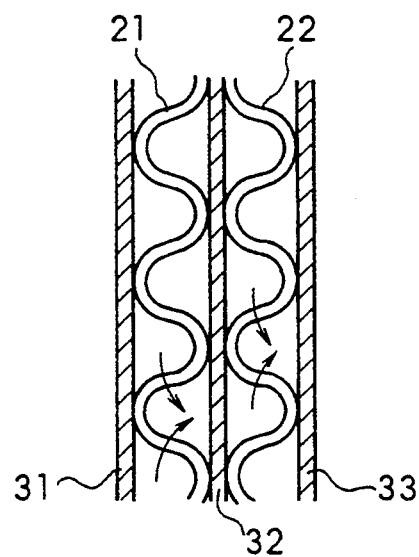
FIG. 5 is a sectional view taken along the line B—B of FIG. 4.

The filter materials 21 to 28 have a plurality of adjoining edges (e.g. 211 and 221) joined together to define openings facing the flow of gases, as shown in FIG. 4, so that the filter 1 may collect fine particles from the gases passing through the filter materials 21 to 28. The filter materials 21 and 22, 23 and 24, 25 and 26, and 27 and 28 are respectively shown together in FIG. 1, since each such pair of filter materials are joined together at the adjoining edges, as shown in FIG. 4.

Figure 6:
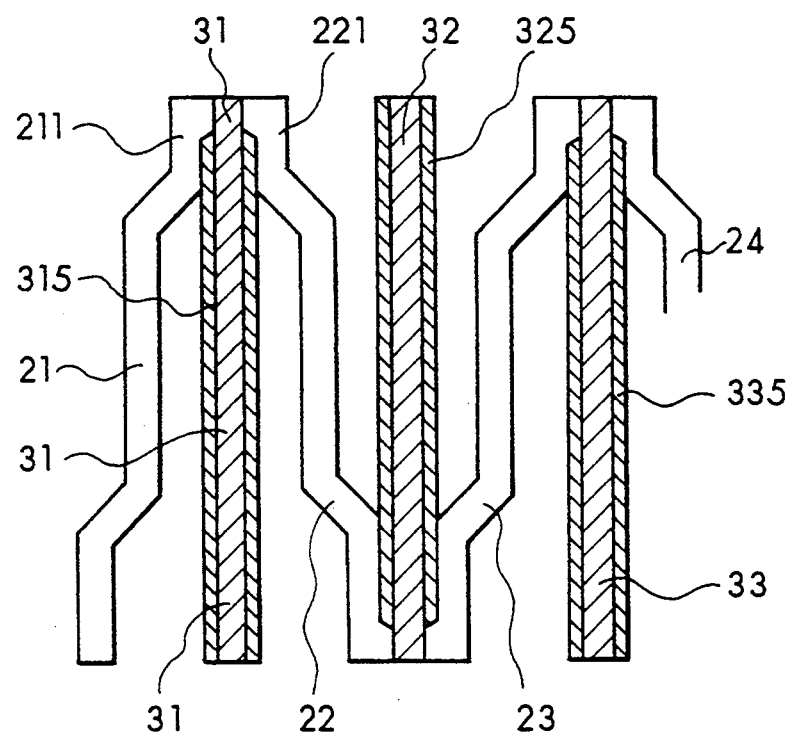
FIG. 6 is a fragmentary sectional view of the filter according to Example 1 which shows the junctions between filter materials and spacers.

The spacers 31 to 38 are interposed in alternate relation to the filter materials 21 to 28. The position of every other spacer 32, 34, 36 or 38 is shown by a broken line in FIG. 1, while the position of each of the other spacers 31, 33, 35 and 37 cannot be shown by a broken line, but is indicated by its parenthesized reference numeral, since it is joined together with the adjoining filter materials, as shown in FIG. 6.

Figure 2:
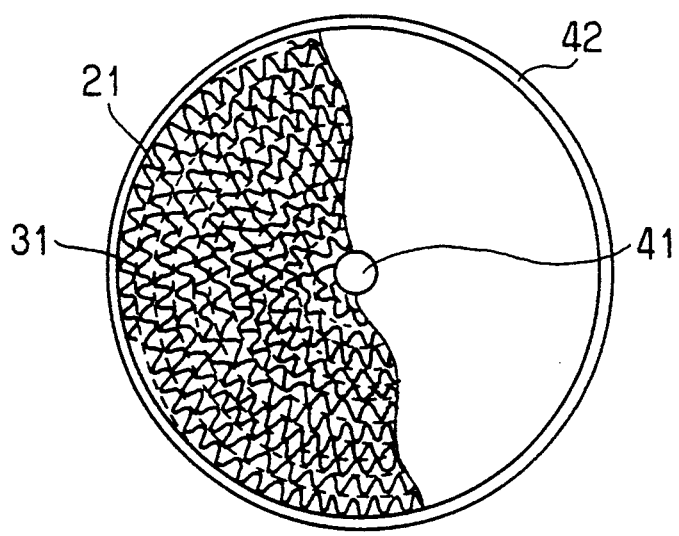
FIG. 2 is a front elevational view of the self-heating filter according to Example 1.
Figure 3:
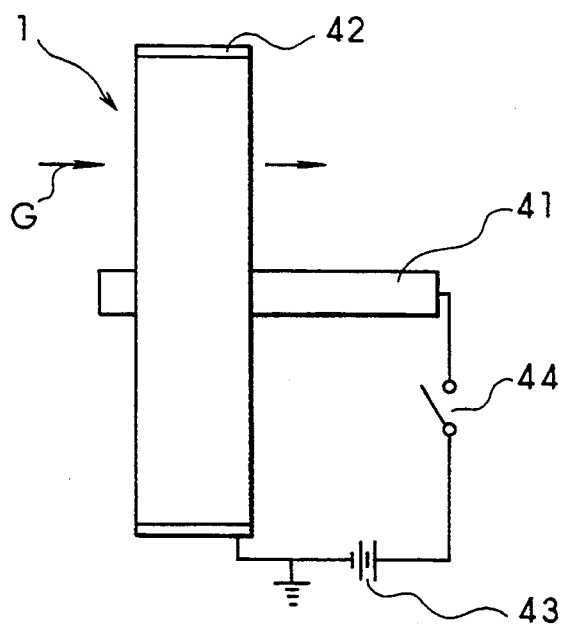
FIG. 3 is an overall explanatory view of the self-heating filter according to Example 1.

The roll of the filter materials 21 to 28 has its center fastened to a central electrode 41,1and its outer periphery fastened to a cylindrical outer electrode 42, as shown in FIGS. 2 and 3. The outer electrode 42 serves also as a metal frame for holding the roll of the filter materials 21 to 28 and the spacers 31 to 38 together in position. The central and outer electrodes 41 and 42 form an electric circuit with a power source 43 and a switch 44 for supplying an electric current for heating the filter materials, as shown in FIG. 3.

The spacers 31 to 38 keep every adjoining two of the filter materials 21 to 28 in a spaced apart relation from each other. One of the spacers is interposed between the edges of every two adjoining filter materials joined together. For example, the spacer 31 is interposed between one edge 211 of the filter material 21 and one edge 221 of the filter material 22, as shown in FIGS. 4 and 6, while the spacer 32 is interposed between the other edge 222 of the filter material 22 and one edge of the filter material 23. Thus, the filter materials 21 to 28 are joined together along the adjoining edges to define openings facing the flow of gases which is shown by arrows in FIG. 4.

The corrugated filter materials 21 to 28 and the plane spacers 31 to 38 are alternately coiled, as shown in FIG. 5. Each of the spacers 31 to 38 has an insulating layer formed on its surface, as shown at 315 in FIG. 6, so that the filter materials and the spacer therebetween are electrically insulated from each other except at their edges joined together. The insulating layer 315 on the spacer 31 is of Al₂O₃, which is employed to form an insulating layer on each of the other spacers 32 to 38, too. The insulating layer 315 terminates inwardly of the junctions between the filter materials 21 and 22 and the spacer 31 and thereby enables their electrical connection at the edges along which they are joined together.

Referring to the use of the filter 1, gases, such as the exhaust gases of a diesel engine, are introduced into the filter 1, and passed through the porous filter materials 21 to 28, as shown by arrows in FIGS. 3, 4 and 5, whereby the particulates, or fine particles which the gases contain are collected by the filter materials 21 to 28.

The filter 1 can be regenerated if an electric voltage is applied across the central and outer electrodes 41 and 42 through the circuit shown in FIG. 3. The application of the voltage results in the flow of an electric current to the filter materials 21 to 28 and the spacers 31 to 38 and the heating thereof, whereby the fine particles collected by the filter 1 are removed by burning, and the filter 1 regenerated.

Description will now be made of the filter in further detail, along with a process for manufacturing it.

Figure 7:
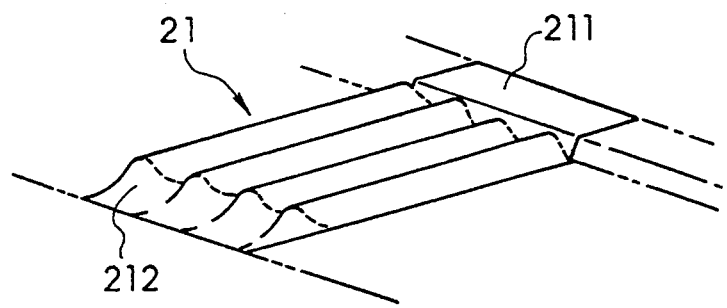
FIG. 7 is a perspective view of a filter material in the filter according to Example 1.

Each of the filter materials 21 to 28 has a length of about 360 mm, a width of 20 mm and a thickness of about 0.25 mm, and its corrugations have a pitch of about 2.5 mm and a height of about 1.5 mm. The following description of the filter materials will mainly be made with reference to only the filter material 21. The filter material 21 has a pair of opposite edge portions 211 and 212 flattened in opposite directions, as shown in FIG. 7, and each having a width of about 3 mm. The filter material 21 is a sintered metal product.

Figure 8:
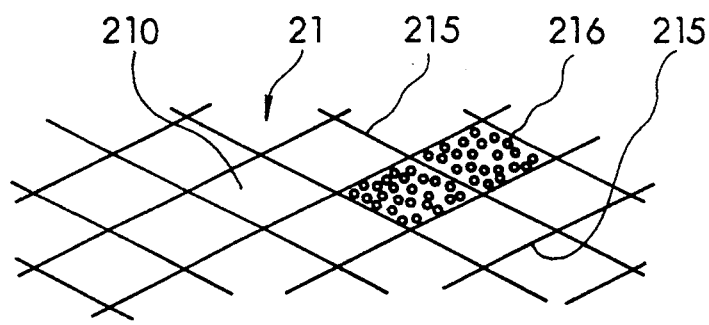
FIG. 8 is an explanatory view of the filter material in the filter according to Example 1.

Description will now be made of a process for manufacturing the filter material. The filter material 21 has as its skeleton a wire net 215 made by cutting and stretching a sheet, and having a multiplicity of openings 210, as shown in FIG. 8. The wire net 215 is corrugated by using gears, etc., and is flattened along the edges 211 and 212. The openings 210 are diamond-shaped, and have a long diameter of about 2 mm and a short diameter of about 1 mm. The net 215 is of ferritic stainless steel consisting of iron, chromium and aluminum, and containing very small amounts of other additives, and is, therefore, highly resistant to heat.

Figure 9:
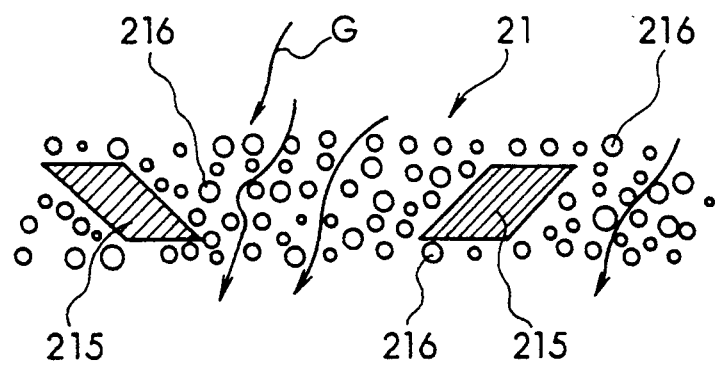
FIG. 9 is a fragmentary enlarged sectional view of the filter material in the filter according to Example 1.

The filter material 21 is made by filling the wire net 215 with a metal powder, as shown in FIGS. 8 and 9, and sintering it. The metal powder consists mainly of iron, chromium and aluminum, and has an aluminum content of at least 5% by weight. It is a mixture prepared by mixing particles having an average diameter of about 10 microns and particles having an average diameter of about 30 microns in a ratio of 1:3.

A slurry is prepared by mixing 100 parts by weight of the metal powder with 0.3 to 5 parts by weight of a binder, such as methyl cellulose, and 20 to 200 parts by weight of water. The wire net 215 is dipped in the slurry, or coated with it, so that the slurry may be deposited in the wire net.

After the slurry has thoroughly been dried, it is fired at a temperature of 1000° C. to 1300° C. for 0.5 to 40 hours in a vacuum to form a sintered mass 216 of the metal powder, whereby the wire net 215 having its openings 210 filled permanently with the sintered mass 216 is obtained as the filter material 21. Then, the filter material 21 is heated at a temperature of 850° C. to 1100° C. for 2 to 10 hours in the open air, whereby a film of Al₂O₃ is formed on the surface of the filter material 21.

FIG. 9 shows an enlarged section of the filter material 21. It shows a porous sintered body 216 of the metal powder filling the openings of the wire net 215 and covering its wire segments. The filter material 21 collects fine particles on and within its surface from gases G passing through the pores of the sintered body 216.

The pore diameter of the filter material depends on various conditions including the size and properties of the fine particles to be collected. It can be altered if the particle size and shape of the metal powder used as the starting material, the sintering conditions, etc. are appropriately selected.

The filter material 21 may consist solely of the sintered body 216 of the metal powder, but the use of the wire net 215 as a support makes it possible to obtain a filter material having a desired shape and a higher degree of strength. The wire net also functions to form a path for the stabilized flow of an electric current.

Each of the spacers 31 to 38 has a length of about 360 mm, a width of 20 mm and a thickness of about 0.05 mm. Only the spacer 31 will be referred to in the following description of a process for manufacturing the spacers.

The spacer 31 is formed from a sheet of ferritic stainless steel having the same composition with that used for making the wire net 215 as hereinabove described. The stainless steel sheet is heated at a temperature of 850° C. to 1200° C. for one to 10 hours in the open air, whereby an oxidation-resistant film of alumina is formed on its surface. Then, its surface is coated with an alumina sol, and after it has been dried, it is heated at a temperature of 850° C. to 1200° C. for one to 10 hours in the open air to form an alumina layer having a greater thickness and defining an insulating layer 315, as shown in FIG. 6.

The spacer 31 formed from the stainless steel sheet can be heated by the electric current applied across the central and outer electrodes. The spacer can, however, be formed from a sheet of a ceramic, or other heat-resistant and electrically insulating material, too. In that case, the spacer 31 is not electrically heated.

The central electrode 41 is a stainless steel rod having a diameter of 8 mm and a length of 50 mm, and the outer electrode 42 is a cylindrical body of stainless steel having an outside diameter of about 80 mm, a length of 20 mm and a wall thickness of about 1.5 mm.

Description will now be made of a method of assembling the filter materials 21 to 28, the spacers 31 to 38, and the central and outer electrodes 41 and 42 into the filter 1.

Figure 1:
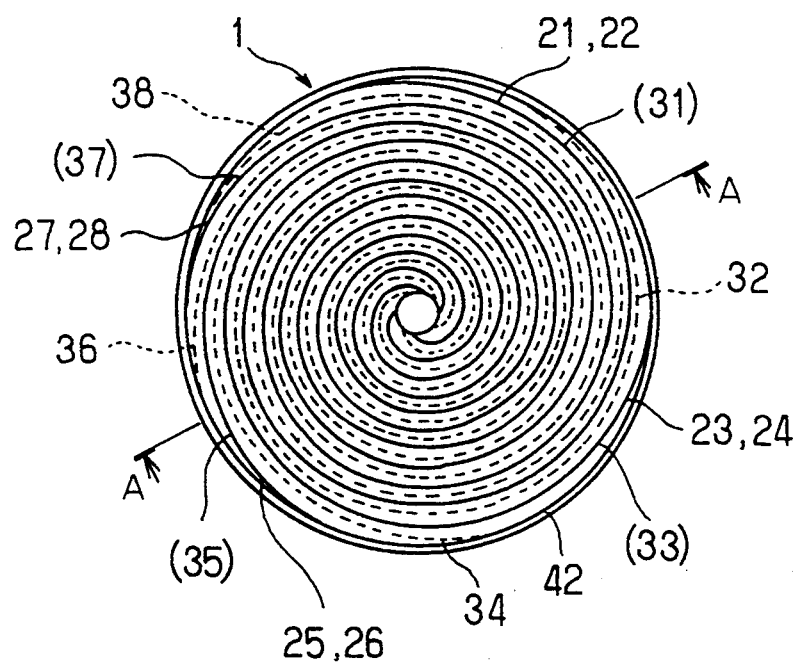
FIG. 1 is an explanatory view of the self-heating filter which will,hereinafter be described as Example 1.

The base ends of the eight filter materials 21 to 28 and the eight spacers 31 to 38 are joined to the central electrode 41, for example, by welding or brazing, as shown in FIG. 1. Then, they are coiled together into a roll, and the roll is inserted in the outer electrode 42 having an inner surface coated with a brazing material, as shown in FIGS. 1 and 2.

The assembly is heated at a temperature of 1000° C. to 1200° C. in a brazing furnace, whereby the roll is brazed to the outer electrode 42. The adjoining edges of the filter material 21 and the spacer 31 are joined together, for example, by welding or brazing, as shown in FIGS. 4 and 6, after the insulating layer has been removed from the spacer at the junction. The other filter materials and spacers are joined together in the same way, whereby the filter 1 is obtained.

The filter 1 as assembled, except the central electrode 41, has an outside diameter of about 80 mm and a length of 20 mm. These dimensions depend on the conditions under which the filter will be used, the value of electrical resistance as required of the filter to produce heat for regeneration, etc.

Figure 10:
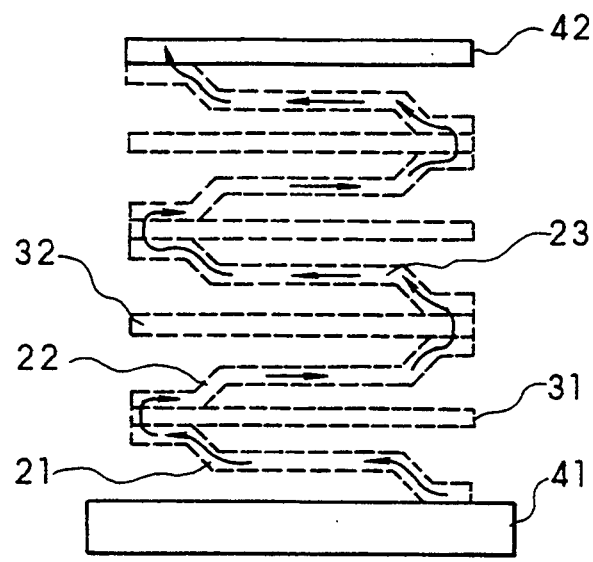
FIG. 10 is a view illustrating the direction in which an electric current for heating the filter material flows across the filter according to Example 1.

Description will now be made of the application of an electric current for causing the filter to produce heat. If an electric voltage is applied across the central and outer electrodes 41 and 42 through the circuit shown in FIG. 3, an electric current flows through the filter materials 21 to 28 and the spacers 31 to 38. The current flows through the assembly both spirally and radially as shown by arrows and broken lines U and arrows and solid lines R, respectively, in FIG. 11. The radial flow of the current occurs through the edges of the filter materials 21 to 28 which are joined to one another, as shown in FIG. 10, while the spiral flow occurs through the filter materials 21 to 28 from the central to the outer electrode.

If the electric current flows only spirally, the filter has a uniform current density and produces heat uniformly. If it flows radially, too, the filter has a somewhat higher current density and therefore a somewhat higher temperature in its central portion. Therefore, it is desirable to raise the radial electrical resistance of the filter to some extent, for example, by elongating a path for the radial flow of the electric current, so that it may have a uniform current density.

The filter produces heat uniformly if the edges of the filter materials are not joined by welding, brazing, etc. The joining of the adjoining edges as hereinabove described, however, has the advantage of ensuring that the filter materials be joined together effectively for the collection of fine particles.

If the filter is used in a vibrating machine or structure, such as an automobile, there is every likelihood that the adjoining filter materials and spacers may be displaced from each other and protrude from the filter, i.e. the problem of the so-called scoping is very likely to occur, if the edges are not joined together. This problem can be avoided if the edges are joined as hereinabove described. It is also possible to avoid problems of e.g. thermal stress which would otherwise result from the joining of different kinds of materials.

Figure 12:
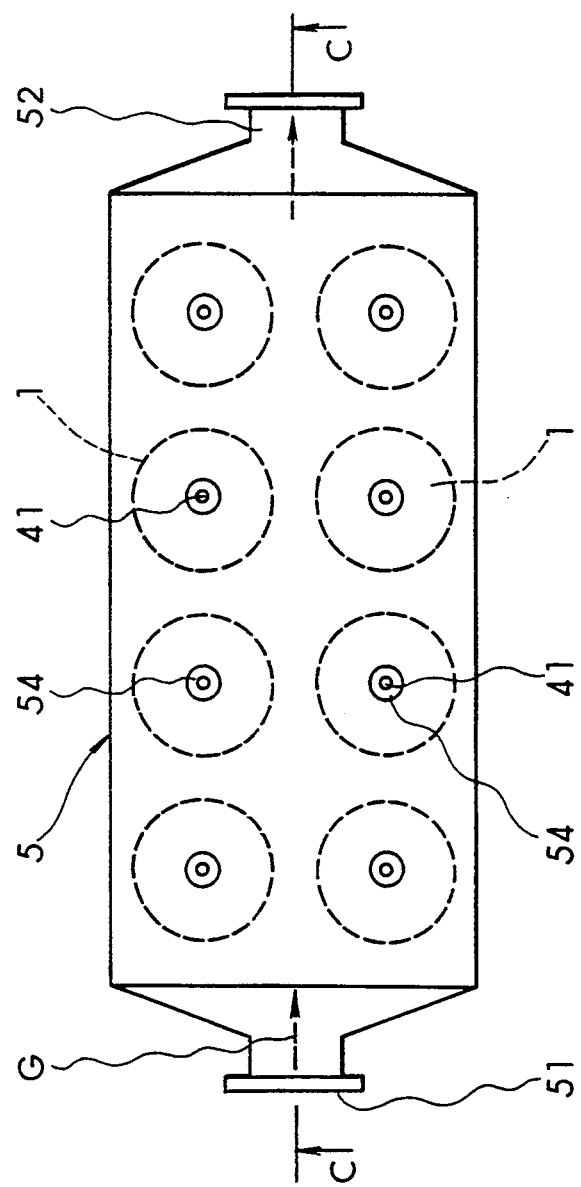
FIG. 12 is a top plan view of a particulate collecting case equipped with self-heating filters according to Example 1.
Figure 13:
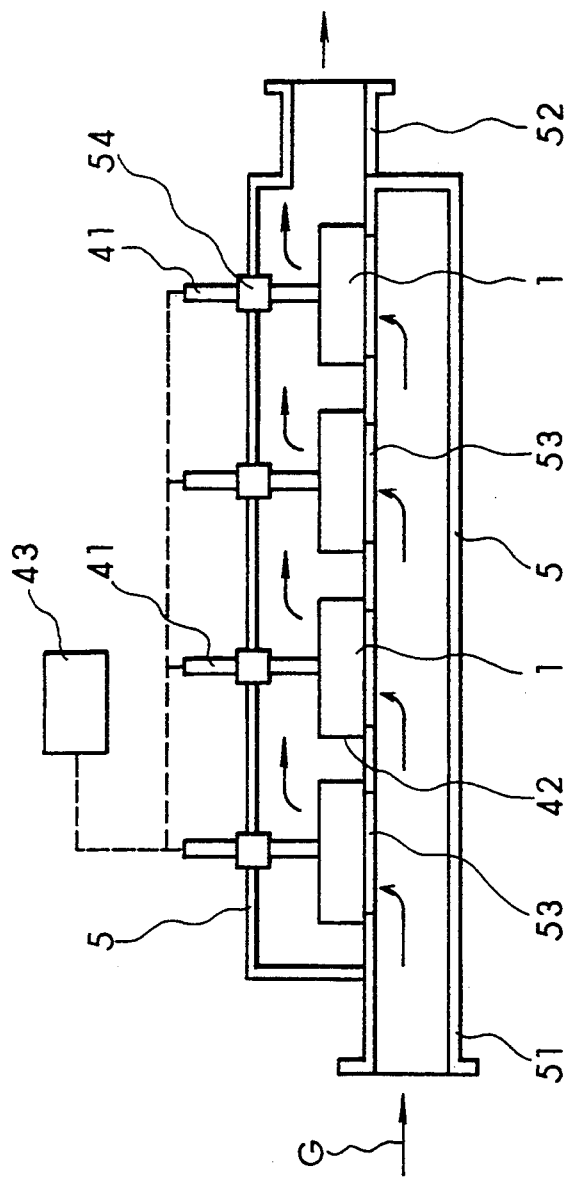
FIG. 13 is a sectional view taken along the line C—C of FIG. 12.

Attention is now directed to FIGS. 12 and 13 showing by way of example the use of the filter 1 for removing particulates from the exhaust gases of a diesel engine. The apparatus shown in FIGS. 12 and 13 includes eight filters 1 installed in a case 5 in parallel to the flow of exhaust gases G. The case 5 has a gas admitting passage 51 and a gas exhausting passage 52 between which the filters 1 are installed. The central electrodes 41 project upwardly from the filters 1 and are electrically connected to the power source 43. An insulating material 54 is interposed between the case 5 and each electrode 41.

The exhaust gases G enter the case 5 through its gas admitting passage 51, enter the filters 1 through openings 53, and leave the filters 1 into the gas exhausting passage 52, as shown by arrows in FIG. 13, whereby the particulates which the gases G contain are collected by the filter materials. More specifically, there was achieved a particulate removal percentage of about 75% as measured by a smoke meter when a diesel engine having a displacement of 3.4 liters was operated at a rotating speed of 1045 rpm and a load of 200 Nm.

Figure 14:
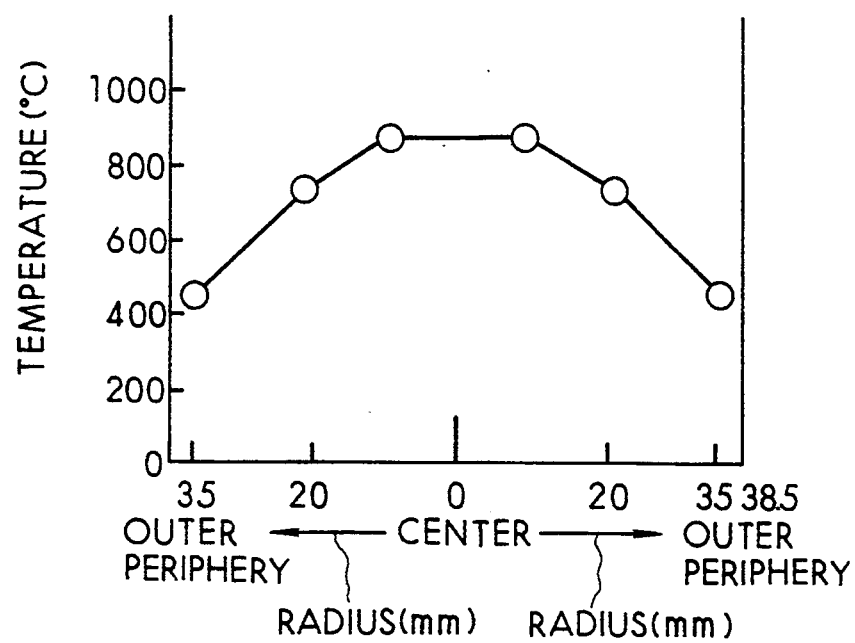
FIG. 14 is a graph showing the distribution of temperatures across the filter according to Example 1.

Reference is now made to FIG. 14 showing the distribution of temperatures as observed across one of the filters 1 in the case 5 when it was electrically caused to produce heat. FIG. 14 shows the temperatures of the filter as measured at a number of points along its radius of 38.5 mm starting at its central electrode 41 which is shown at 0. These results were obtained when a voltage of 4.5 V was applied across the filter 1, while air was passed through the filter 1 at a rate of four liters per minute. As is obvious from the graph, the filter showed a considerable temperature drop toward the outer electrode.

An attempt was made to remove the particulates from the filter by burning, while supplying air as hereinabove mentioned, to thereby regenerate it. The air was supplied to flow in the same direction as the gases G. A regenerating efficiency of about 75% was achieved. The filter was heated 20 times repeatedly, but was not damaged at all.

As is obvious from the foregoing, the filter embodying this invention has a high degree of strength to withstand regeneration under heat and a high efficiency in the collection of particulates, and is easy to manufacture.

[EXAMPLE 2]

Figure 15:
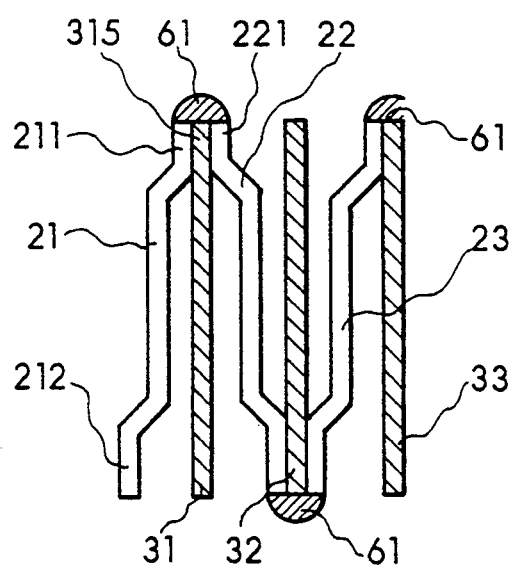
FIG. 15 is a fragmentary sectional view of a self-heating filter according to Example 2.

The filter according to this example which is shown in FIG. 15 is substantially identical in construction to that of Example 1, but is distinguished from it by the edges of the filter materials which are joined together by an electrically insulating adhesive. The filter includes the same filter materials 21 to 28, and spacers 31 to 38 as the filter of Example 1 does. The edges 211 and 221 of the filter materials 21 and 22, and the spacer 31 interposed therebetween, for example, are, however, joined together at their butt ends by the electrically insulating adhesive 61, as shown in FIG. 15.

Preferred examples of the adhesive are of a ceramic material, such as $Al_2O_3$ or $SiO_2$. The adhesive preferably has a coefficient of thermal expansion which is close to that of the filter materials and spacers. The other adjoining edges of the filter materials and spacers are likewise joined together.

According to another important feature of the filter under description, the whole spacer 31, for example, including its edge interposed between the filter materials, is covered with the insulating layer 315, as opposed to Example 1 (FIG. 6). Therefore, the edges 211 and 221 of the filter materials 21 and 22 are electrically insulated from each other by the insulating layers 315 on the spacer 31.

Figure 16:
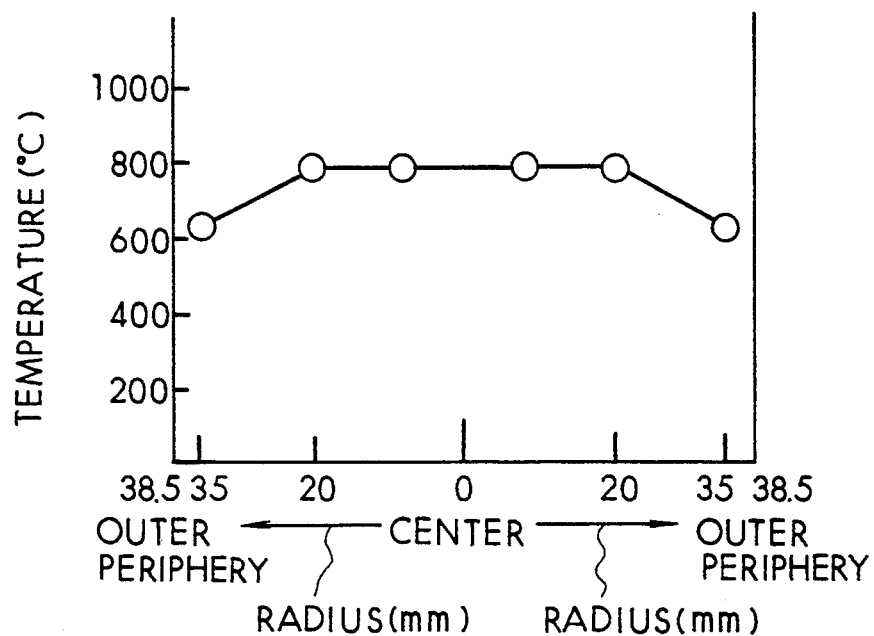
FIG. 16 is a graph showing the distribution of temperatures across the filter according to Example 2.

An electric current was applied to the filter as hereinabove described. FIG. 16 shows the distribution of temperatures as observed across the filter, and FIG. 17 shows the direction in which the current was found to flow through the filter.

Figure 17:
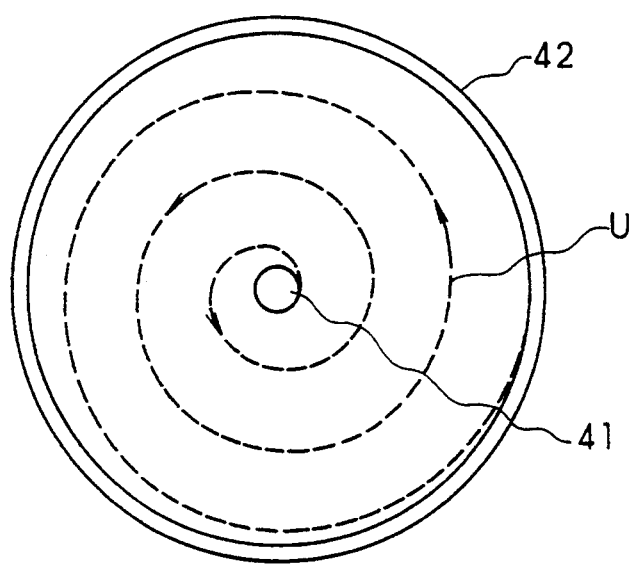
FIG. 17 is a view illustrating the direction in which an electric current for heating the filter material flows across the filter according to Example 2, as represented in front elevation.

As is obvious from FIG. 17, the electric current flowed only spirally as shown by arrows and broken lines U, insofar as the filter materials 21 to 28 are electrically insulated at their joined edges by the electrically insulating adhesive 61 and the insulating layers 315, etc. on the spacers.

The filter, therefore, has a uniform current density and can heat itself very uniformly with a smaller difference in temperature between its central and outer peripheral portions, as is obvious from the comparison of FIG. 16 with FIG. 14 (Example 1). Thus, a regenerating efficiency of about 87%, which was higher than what was obtained in Example 1, could be achieved upon regeneration by repeating the procedures employed in Example 1. In the other aspects of its use and performance, the filter under description is comparable to that of Example 1.

The regeneration of the filter as hereinabove described relies solely upon heat, i.e. the heat produced in the filter materials by an electric current, and the heat produced by the combustion of particulates. The regeneration may, however, further include the passing of air into the filter in the opposite direction to the flow of the gases to be purified, or from downstream, while relying upon the heat. The air is supplied after the filter has been heated to or above the combustion temperature of the particulates, and when the particulates have started burning in their layers contacting the filter materials. In other words, the air is supplied to blow the particulates away from the filter materials when not all of the particulates have burned as yet. The particulates which have been blown out of the filter are collected in a vessel positioned upstream of the filter to be burned, or otherwise disposed of. This is the advantage of the filter of the self-heating type which cannot be achieved if only the supply of air as hereinabove described is relied upon for regeneration, while no heat is relied upon. The mere use of air can hardly regenerate the filter perfectly, since the particulates adhere strongly to the filter materials.

Although the filter materials 21 to 28 in the filter as hereinabove described are supplied with an electric current independently of one another, it is alternately possible to construct the filter so that each pair of filter materials, such as 21 and 22, or 23 and 24, may form a single unit, as far as the supply of an electric current is concerned.

An attempt was made to study the effect which the external dimensions of the filter might have on the amount of electricity as required for burning particulates. A comparative filter was prepared by increasing each of the width of the filter materials 21 to 28 and the spacers 31 to 38 and the lengths of the central and outer electrodes 41 and 42, i.e. the comparative filter, except the central electrode, had an outside diameter of about 80 mm and a length of 40 mm. The comparative filter having a heat capacity twice larger than that of the filter as hereinabove described required about twice as large an amount of electricity for heating to the combustion temperature of particulates, if the same heating rate was employed. It, however, required only substantially the same amount of electricity for maintaining the combustion temperature of the particulates, as what the filter as hereinabove described did. This is due to the fact that the comparative filter had only 1.3 times as large an external surface area despite its twice larger volume, and did, therefore, not lose a very large amount of heat by radiation. The comparative filter showed a regeneration efficiency of 86%.

It is, however, desirable to select the size, shape and number of the filters employed appropriately in accordance with the amount of particulates to be removed, and the amount of electricity available, as the amount of electricity required for burning the particulates and its control depend on the size and shape of the filters.

[EXAMPLE 3]

Figure 18:
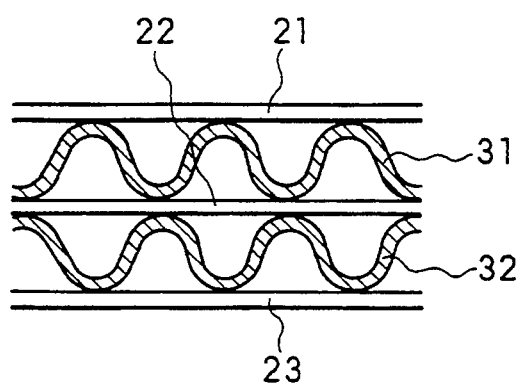
FIG. 18 is a fragmentary sectional view of a self-heating filter according to Example 3.
Figure 19:
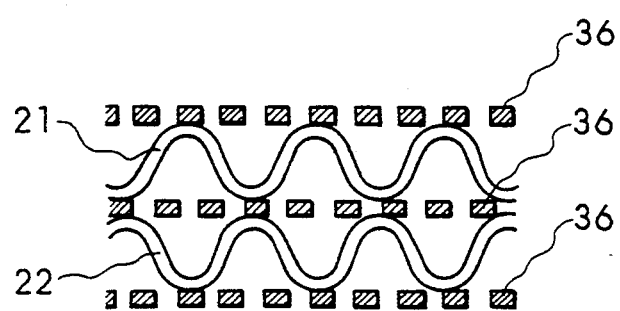
FIG. 19 is a fragmentary sectional view of a modified form of filter according to Example 3.
Figure 20:
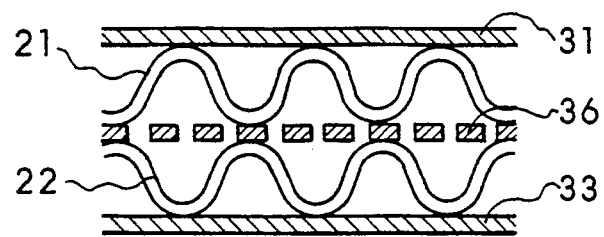

Reference is now made to FIGS. 18 to 20 showing modified forms of filter materials and spacers. FIG. 18 shows plane filter materials 21 to 23 and corrugated spacers 31 and 32, as opposed to their counterparts in the filter according to Example 1. The other filter materials and spacers not shown are also shaped like those shown in FIG. 18. Moreover, the filter materials and spacers may both be corrugated, though not shown, if they are appropriately spaced apart from each other. In any other aspect of its construction and use, the filter shown fragmentarily in FIG. 18 is identical to what has been described as Example 1.

FIG. 19 shows fragmentarily a modified form of filter according to Example 1 in which the spacers are each in the form of a wire net as shown at 36. FIG. 20 shows fragmentarily a modified form of filter according to Example 1 which includes spacers 36 of the type shown in FIG. 19 in alternate relation with plane spacers 31 and 33.

Although the filter according to Example 1 has eight sheets each of filter materials and spacers, it, as well as any modified form thereof, may alternatively be constructed with a different number of filter materials and spacers.

[EXAMPLE 4]

Figure 11:
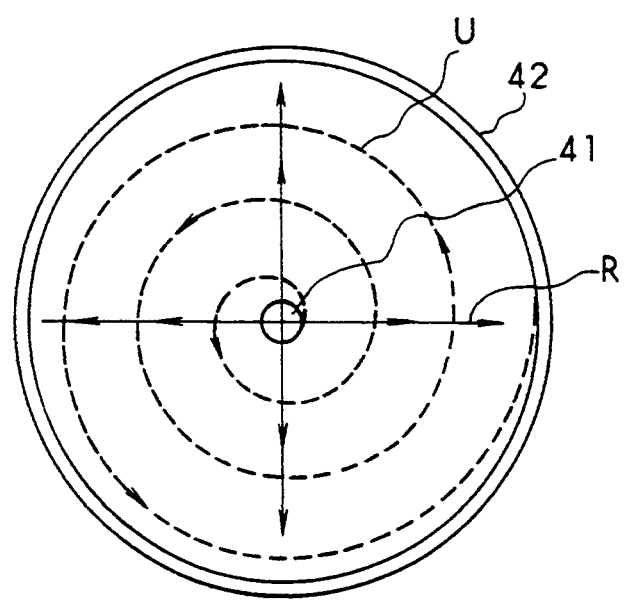
FIG. 11 is a view illustrating the flow of the electric current across the filter according to Example 1, as represented in front elevation.
Figure 21:
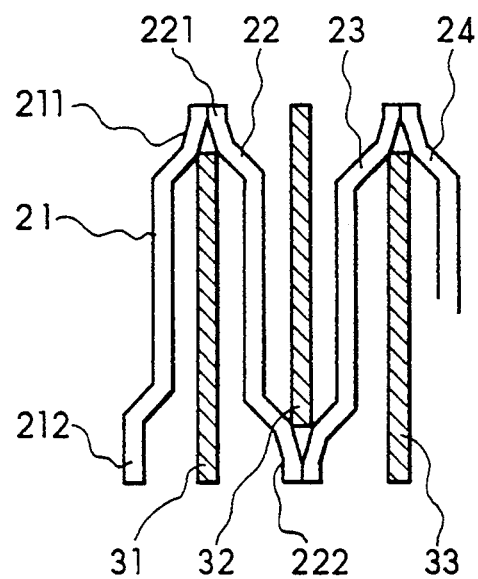
FIG. 21 is a fragmentary sectional view of a self-heating filter according to Example 4.

FIG. 21 shows a modified form of filter according to Example 1 in which each pair of adjoining edges of filter materials, e.g. the edges 211 and 221 of the filter materials 21 and 22, are joined together directly without having the edge of a spacer, e.g. 31, interposed therebetween. The spacer 31 terminates inwardly of the edges 211 and 221. Compare FIG. 21 with FIG. 4 showing Example 1. The electric current flows both spirally and radially through the filter, as is the case with Example 1, and as shown in FIG. 11.

Although the filter materials in the filter of Example 1 have been described as each comprising a sintered metal product coated with an oxide film, it is further possible to form a highly insulating layer on the oxide film, for example, by flame spraying from a ceramic material, such as $Al_2O_3$. In that case, no insulating layer need be formed on any spacer, but if each pair of adjoining edges of filter materials and a spacer interposed therebetween are joined together, an electric current flows spirally through the filter and heats it uniformly. The insulating layer on the filter material can be formed from, for example, a powder of a ceramic material such as $Al_2O_3$ or $SiO_2$, or its fibers.

[EXAMPLE 5]

Figure 22:
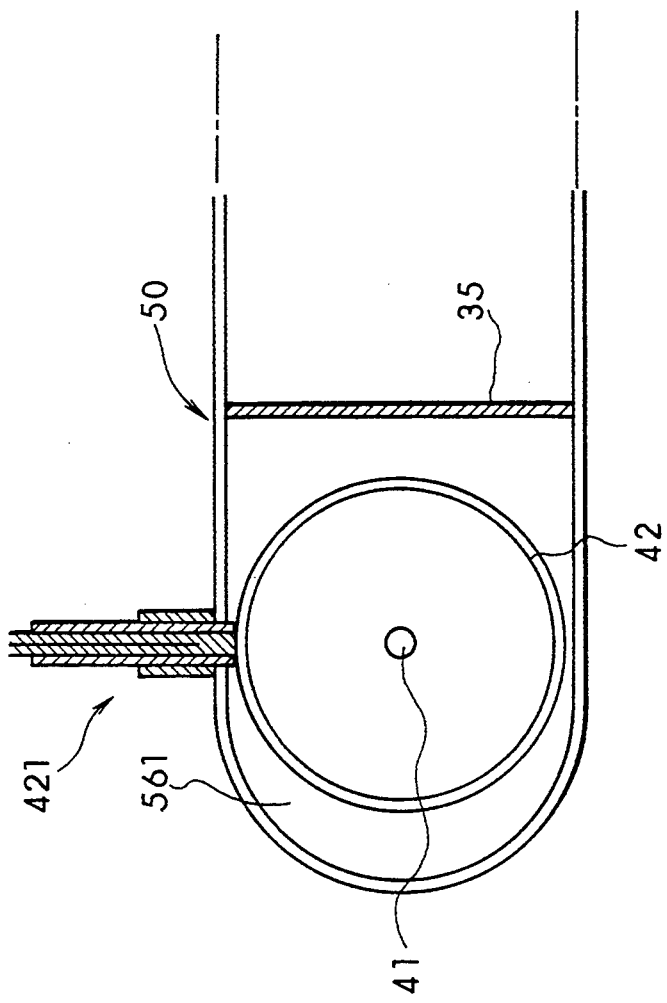
FIG. 22 is a sectional view of a self-heating filter according to Example 5, as taken along the line D—D of FIG. 23.
Figure 23:
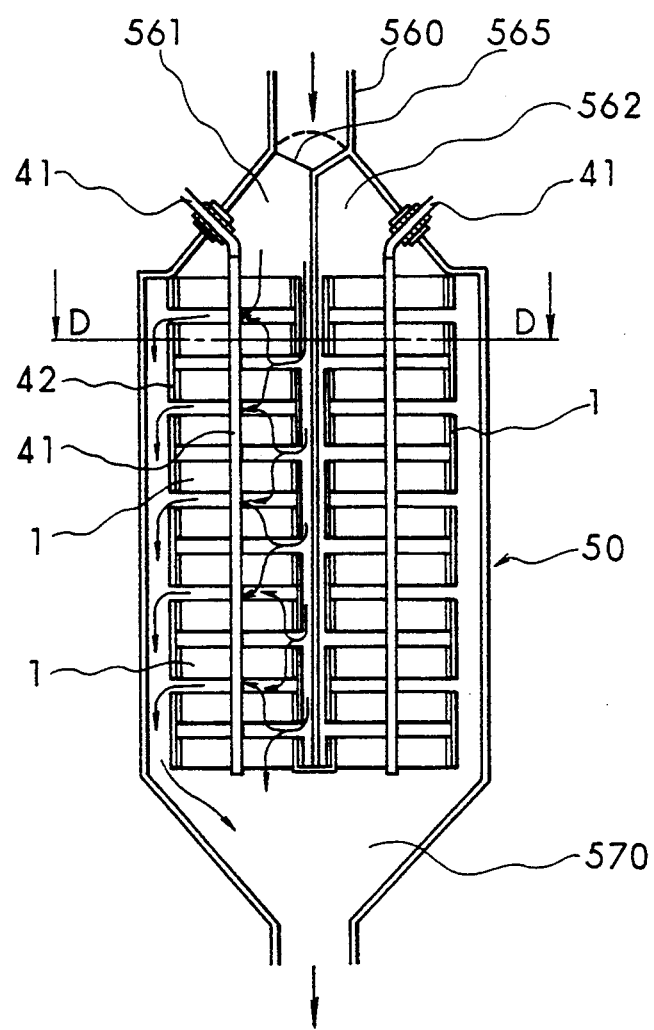
FIG. 23 is a sectional view of a particulate collecting case equipped with filters according to Example 5.

Attention is directed to FIGS. 22 and 23 showing an apparatus for removing particulates from the exhaust gases of a diesel engine. The apparatus comprises a casing 50 defining two chambers separated from each other, i.e. the left and right chambers 561 and 562. The casing 50 has a gas admitting passage 560 and a gas exhausting passage 570, and is provided between the gas admitting passage 560 and the two chambers 561 and 562 with a damper 565 which is rotatable to open the inlet of one of the chambers for admitting the exhaust gases thereinto.

Each chamber 561 or 562 houses a plurality of filters 1, which have already been described in detail, and the central electrodes 41 of the filters 1 are connected in series to one-another. The filters 1 in each chamber are joined together in a staggered fashion to form an array in which a first pair of filters 1 are joined together on one side, while a second pair of filters 1 including one of the first pair of filters 1 are joined together on the other side, so that the exhaust gases may generally enter the filters 1 on one side of the array, and leave them on the other side thereof, as shown by arrows in FIG. 23. The exhaust gases arriving from the engine enter the casing 50 through its gas admitting passage 560, flow through the filters 1 in one of the chambers 561 and 562 depending on the position of the damper 565, and leave the casing 50 through its gas exhausting passage 570. The two chambers 561 and 562 are separated from each other by a wall 35 (FIG. 22). An electric cable 421 (FIG. 22) is connected to the outer electrodes 42 of the filters 1.

The apparatus is useful for the continuous removal of particulates, as the filters in one of the chambers are used for collecting the particulates, while those in the other chamber closed by the damper 565 are being regenerated.

INDUSTRIAL APPLICABILITY

As is evident from the foregoing, the self-heating filter of this invention is useful for collecting particulates from the exhaust gases of a diesel engine, or the like.

What is claimed is:

1. A self-heating filter comprising:
   a spiral roll of an electrically conductive filter material having a plurality of pairs of adjoining edges joined together to define openings facing the flow of gases to collect fine particulates from said gases passing through said filter material; and
   electrodes provided at each of the center and outer periphery of said roll for applying an electric current to heat said filter material in such a manner that the electric current spirally flows along said roll of the filter material.

2. A filter according to claim 1, wherein said filter material comprises a corrugated sheet.

3. A filter according to claim 1, wherein said filter material is electrically insulated from an adjoining filter material.

4. A filter according to claim 1, wherein said filter material is electrically insulated from an adjoining filter material except at adjoining edges thereof.

5. A filter according to claim 1, further comprising a spacer disposed in alternate relation to said filter material for insulating two adjoining filter materials.

6. A filter according to claim 5 wherein said spacer comprises a perforated sheet in the form of a wire net.

7. A filter according to claim 5, wherein said filter material is formed from a metal net having a mesh portion on which a plurality of holes are equally distributed therein, and, a porous sintered body obtained from metallic powder having the same composition as said metal net, said porous sintered body covering said metal net.

8. A filter according to claim 5, wherein said filter material comprises a corrugated sheet and said spacer comprises a plane sheet.

9. A filter according to claim 8, wherein said spacer provides electric insulation.

10. A filter according to claim 9, wherein said spacer is a metal plate having an insulated surface.

11. A self heating filter comprising:
    a center electrode disposed at the center of the filter;
    an electrically conductive filter material of which a first end is connected to said center electrode and is spirally coiled around said central electrode;
    a spacer having an insulator thereon and disposed in alternate relation to said filter material so that said spacer is spirally coiled around said center electrode in such a manner to be sandwiched by adjoining filter material; and
    an outer electrode disposed on the outer periphery of said filter material, wherein a plurality of pairs of adjoining edges of said filter material is joined together to define openings facing a flow of gases to collect fine particulates from gas passing though said filter material and an electric current flowing from one of said electrodes flow spirally along said filter material.

12. A filter according to claim 11, wherein said electrically conductive filter material has an upper end and a lower end which are perpendicular to said first end, every other pair of adjoining said electrically conductive filter materials is joined together with said spacer interposed between said pair of adjoining filter materials at said upper end thereof, and every other pair of adjoining said electrically conductive filter materials which is different from said every other adjoining filter materials is joined together with said spacer interposed between said pair of adjoining filter materials at said lower end thereof so that a pair of adjoining said electrically conductive filter materials defines an opening facing the flow of gases at said upper end thereof and a closure at said lower end thereof.

13. A filter according to claim 11, wherein said filter material is formed from a metal net having a mesh portion on which a plurality of holes are equally distributed therein, and, a porous sintered body obtained from metallic powder having the same composition as said metal net, said porous sintered body covering said metal net, said spacer providing electric insulation.

* * * * *